United States Patent [19]

Arita et al.

[11] 4,214,925

[45] Jul. 29, 1980

[54] METHOD FOR FABRICATING BRAZED ALUMINUM FIN HEAT EXCHANGERS

[75] Inventors: Koji Arita, Kobe; Masahiro Chiji, Akashi; Takayoshi Asami, Otsu; Yasuhumi Karaki, Hyogo; Toshihiko Endo, Akashi, all of Japan

[73] Assignee: Kobe Steel, Limited, Kobe, Japan

[21] Appl. No.: 952,160

[22] Filed: Oct. 17, 1978

[30] Foreign Application Priority Data

Oct. 25, 1977 [JP] Japan .................. 52-128878

[51] Int. Cl.$^2$ ..................... B23P 15/26; B27C 1/00
[52] U.S. Cl. ..................... 148/127; 29/157.3 B
[58] Field of Search ............. 148/127; 29/157.3 A, 29/157.3 B; 113/118 A, 118 B

[56] References Cited

U.S. PATENT DOCUMENTS

| | | | |
|---|---|---|---|
| 1,840,724 | 1/1932 | Koehring | 29/157.3 A |
| 2,837,450 | 6/1958 | Moore et al. | 148/21.91 |
| 3,019,144 | 1/1962 | Murphy et al. | 148/12.7 |
| 3,104,189 | 9/1960 | Wagner | 148/32.5 |
| 3,171,760 | 3/1965 | Vernam et al. | 148/159 |
| 3,184,349 | 5/1965 | Burwen | 148/125 |
| 3,194,545 | 7/1965 | Smith | 266/3 |
| 3,198,676 | 8/1965 | Sprowls et al. | 148/159 |
| 3,222,227 | 12/1965 | Baugh et al. | 148/11.5 |
| 3,232,054 | 2/1966 | Jackson et al. | 60/39.74 |
| 3,290,187 | 12/1966 | Paul | 148/159 |
| 3,542,606 | 11/1970 | Westerman et al. | 148/12.7 |
| 3,582,406 | 6/1971 | Ford | 148/12.7 |
| 3,836,405 | 9/1974 | Staley | 148/12.7 |
| 3,850,705 | 11/1974 | Furney, Jr. et al. | 148/13.1 |
| 3,852,873 | 12/1974 | Chartet | 29/157.3 |
| 3,856,583 | 12/1974 | Sanders et al. | 148/159 |
| 3,988,180 | 10/1976 | Bouvaist | 148/159 |
| 4,035,201 | 7/1977 | Anderson et al. | 148/127 |

*Primary Examiner*—Francis S. Husar
*Assistant Examiner*—V. K. Rising
*Attorney, Agent, or Firm*—Oblon, Fisher, Spivak, McClelland & Maier

[57] ABSTRACT

In a method for fabricating a brazed aluminum fin heat exchanger comprising a pair of brazing sheets each consisting of a core sheet and a cladding of brazing material disposed on either side of said core sheet and a corrugated fin interposed between the brazing sheets and brazed thereto, an improved process comprises making at least the fin of a heat-treatable (age-hardenable) aluminum alloy in the Al-Mg-Si system containing 0.15 to 0.4% copper, assembling the fin with said brazing sheets into a brazed aluminum fin heat exchanger unit, maintaining the heat exchanger unit at a temperature between 500° C. and 570° C. for a time from 30 minutes to 4 hours, quenching the solution-treated unit to room temperature under cooling conditions which provide a cooling rate between 2.8° C./min. and 50° C./min. down to 200° C. and thereafter, age-hardening the quenched heat exchanger unit. The above heat-treatable aluminum alloy in the Al-Mg-Si system is AA 6951 or AA 6061.

11 Claims, 6 Drawing Figures

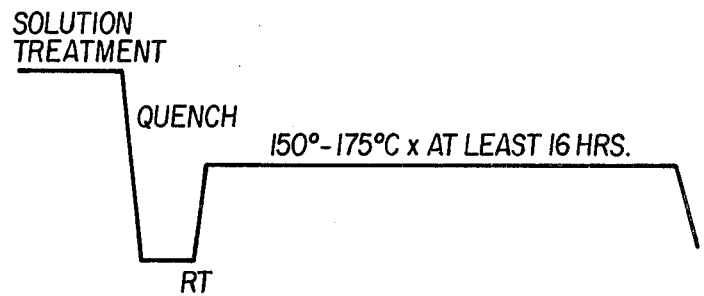
FIG. 4 ONE-STAGE AGE-HARDENING
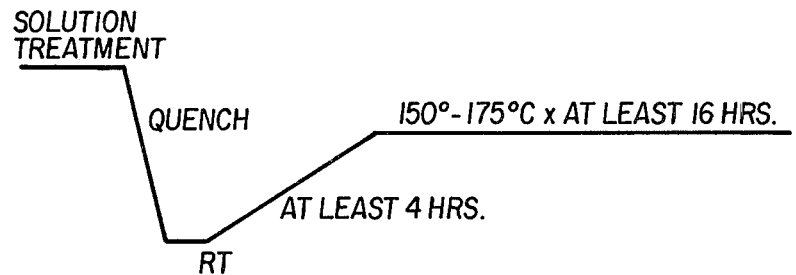
FIG. 5 INCREMENTAL AGE-HARDENING
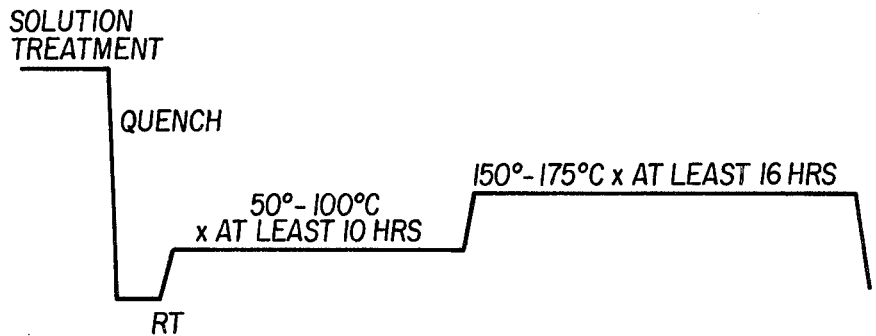
FIG. 6 TWO-STAGE AGE-HARDENING

METHOD FOR FABRICATING BRAZED ALUMINUM FIN HEAT EXCHANGERS

BACKGROUND OF THE INVENTION

1. Field of the Invention

This invention relates to a method for fabricating brazed aluminum fin heat exchangers with high tensile strength or bursting strength.

2. Description of the Prior Art

Recently, plants for extractive separation of useful components from natural gas and other hydrocarbon sources have been built in many parts of the world and a large number of pressure-resistant brazed aluminum heat exchangers have been employed in such plants. With the increased severity of operating conditions, such heat exchangers have had to be more pressure-resistant. Thus, the conventional brazed aluminum fin heat exchangers (for example, the equipment available under the trademark ALEX) have been fabricated by interposing a fin member between a pair of brazing sheets each made up of a core sheet and a cladding layer of brazing material on either side of said core sheet, immersing the assembly in a salt bath (about 600° C.) to transform the brazing material into a semi-fused state and cooling it so that the fin and brazing sheets will be integrally joined. However, because AA 3003 (wherein AA signifies the standard of the Aluminum Association) brazing alloy is used in this prior art method, the maximum bursting strength has been only somewhere between 50 and 60 Kg/cm$^2$, although the method is conducive to satisfactory fin formation. It has, therefore, been proposed to increase the thickness of the fin in an attempt to improve the bursting strength but such a procedure has proved to be detrimental to fin formation. Thus, it has been impossible to obtain small fins with a fin pitch of the order of several millimeters or what are known as serrated fins.

The aforementioned AA 3003 alloy may be replaced with AA 3004 in the manufacture of fins. Having a tensile strength beyond 17 Kg/mm$^2$, AA 3004 provides for high bursting strength. However, this material has unsatisfactory fin formation characteristics. Moreover, AA 3004 contains nearly one percent of Mg and, in the course of the brazing operation, this element combines with Si in the brazing material (e.g., AA 4343). This interaction results in an increased diffusion of the brazing material into the fin material, thus interfering with the brazing. Thus, reduced strength and failures to establish brazed joints have been shortcomings of this process. Thus, by any of these prior art methods, it has been difficult to fabricate a brazed aluminum fin heat exchanger with bursting strength in excess of 80 Kg/cm$^2$.

It has been proposed to prepare brazed aluminum fin heat exchangers using alloys of the Al-Mg-Si system wherein the brazed heat exchanger after brazing is subjected to a solution heat treatment followed by rapid quenching and subsequent age-hardening. Chartet, U.S. Pat. No. 3,852,873, discloses such a process in which the assembled heat exchanger is brazed and then immediately quenched at a rate of at least 1.0° C./sec, that is at least 60° C./min. and subsequently age-hardened. Moore, U.S. Pat. No. 2,837,450, discloses a similar process for making a heat exchanger, wherein the brazed exchanger is subjected to a solution heat treatment, quenched, and subsequently age-hardened. Burwen, U.S. Pat. No. 3,184,349, discloses a process for making a brazed aluminum enclosure for electronic devices which also involves subjecting the brazed article to a solution heat treatment, quenching rapidly with chilled gas, and subsequently age-hardening. All three of these patents disclose the use of alloys which contain little or no copper such as AA 6063. Burwen also discloses the use of AA 6061 which does contain copper, but his disclosure emphasizes the necessity of rapid quenching of the assembled brazed article after the solution heat treatment.

The rapid quenching of the assembled heat exchanger taught in these patents has a number of shortcomings in industrial practice. (1) Such rapid rates of quench are difficult to attain, especially for large heat exchangers which have an appreciable heat capacity. (2) The rapid contraction of the article during quenching can cause plastic deformation of the fin resulting in dimensional inaccuracies in the exchanger. The fin may even be ruptured by the stresses. (3) Residual stress due to the rapid quenching may remain in the heat exchanger which may give rise to stress corrosion cracking in use. (4) The strength of the fin may be nonuniform due to nonuniform quenching since the cooling rate may be different between the outside and inside surfaces of the fin.

The conflict between the requirement for rapid quenching to ensure proper hardening, and the problems introduced by the rapid quenching indicates that a need has continued to exist for a process capable of making a high-strength brazed aluminum fin heat exchanger using a slower rate of quenching in the heat treatment procedure.

SUMMARY OF THE INVENTION

It is, therefore, an object of this invention to provide a brazed aluminum fin heat exchanger having a pressure resistance bursting strength of at least 80 Kg/cm$^2$, which has been demanded by the users.

The above-noted object, as well as other objects which will become apparent from the description that follows, has been accomplished by this invention, which is directed to a method for fabricating a brazed aluminum heat exchanger consisting of a pair of brazing sheets each made up of a core sheet and a cladding of brazing material on either side of the core sheet and a corrugated fin member brazed to the brazing sheets with the brazing material, comprising making at least the fin of a heat-treatable aluminum alloy in the Al-mg-Si system containing 0.15 to 0.4% copper, assembling the fin with the brazing sheets into a brazed heat exchanger unit, heating the brazed heat exchanger unit at a temperature between 500° C. and 570° C. for a period of 30 minutes to 4 hours, thereafter quenching the same unit under conditions which provide a cooling rate of 2.8° C. to 50° C. per minute down to 200° C. and subjecting it further to an age-hardening treatment.

Thus by the use of alloys of the Al-Mg-Si system which contain a certain amount of copper a quenching rate lower than that taught by the prior art can be used and the problems associated with such rapid quenching rates can be avoided while a heat exchanger having the high bursting strength required by modern process technology can be achieved.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein:

FIGS. 4, 5 and 6 are schematic views showing various modes of age-hardening.

DETAILED DESCRIPTION OF THE PREFERRED EMBODIMENTS

This invention will hereinafter be described by way of the following preferred embodiments.

In a first embodiment, the heat-treatable aluminum alloy of the Al-Mg-Si system for the manufacture of fins is AA 6951 alloy (0.15–0.4% Cu, 0.2–0.5% Si, up to 0.8% Fe, up to 0.1% Mn, 0.4–8% Mg up to 0.2% Zn, up to 0.15% others, the balance Al). The term "heat-treatable aluminum alloy" is used herein to mean an aluminum alloy which is age-hardenable under accelerated conditions. The core sheet material for the manufacture of said brazing sheets is AA 3003, which is conventionally employed for the purpose, or AA 6951 (the same as the fin material). The brazing material may be AA 4045, AA 4343 or AA 4047. These materials may be employed in the six combinations given in Table 1.

TABLE 1

| Case | Fin | Core | Brazing Material |
|---|---|---|---|
| I | AA 6951 | AA 6951 | AA 4045 |
| II | AA 6951 | AA 3003 | AA 4045 |
| III | AA 6951 | AA 6951 | AA 4343 |
| IV | AA 6951 | AA 3003 | AA 4343 |
| V | AA 6951 | AA 6951 | AA 4047 |
| VI | AA 6951 | AA 3003 | AA 4047 |

The compositions of AA 3003, one of the core materials, and AA 4045, AA 4343 and AA 4047, which are brazing materials, are set forth in Table 2.

TABLE 2

| | Cu | Fe | Mn | Mg | Si | Zn | Cr | Ti | Other | Bal. |
|---|---|---|---|---|---|---|---|---|---|---|
| AA 3003 | 0.05–0.20 | up to 0.7 | 1.0–1.5 | — | up to 0.6 | up to 0.10 | — | | | Al |
| AA 4045 | up to 0.3 | up to 0.8 | up to 0.05 | up to 0.05 | 9.0–11.0 | up to 0.10 | — | up to 0.20 | up to 0.15 | Al |
| AA-4343 | up to 0.25 | up to 0.8 | up to 0.10 | — | 6.8–8.2 | up to 0.20 | — | — | up to 0.15 | Al |
| AA 4047 | up to 0.3 | up to 0.8 | up to 0.15 | up to 0.10 | 11.0–13.0 | up to 0.20 | — | — | up to 0.15 | Al |

Using the above materials, brazed aluminum fin heat exchangers are fabricated by the following procedures. Thus, a corrugated fin made of fully annealed AA 6951 is interposed between a pair of brazing sheets each consisting of a core sheet and a cladding of brazing material on either side of the core sheet and the assembly is brazed by the procedure conventional per se. Thus, this heat exchanger unit is preheated to 570° C.–580° C. and then immersed in a salt bath of a predetermined composition at 590° to 600° C. whereby the brazing material is transformed into a semi-fused state and hence, the fin is brazed to the brazing sheets to yield an integral unit.

Figure 1:
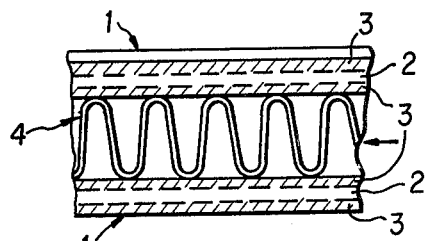
FIG. 1, is a longitudinal section view showing the principal parts of a brazed aluminum fin heat exchanger.

The resultant heat exchanger unit is withdrawn from the salt-bath furnace and cooled. From a temperature of 400° C. and thereunder, the heat exchanger unit is cooled and freed of the salt with hot water and, therefore is washed with sodium hydroxide solution and nitric acid, rinsed and dried. FIG. 1 is a longitudinal section view showing the principal aprts of the brazed aluminum fin heat exchanger fabricated in the described manner.

In FIG. 1, the following reference numerals indicate the following: (1) the brazing sheet, (2) the core sheet, (3) the brazing material and (4) the fin.

The brazed aluminum fin heat exchanger fabricated with the use of an AA 6951 fin is age-hardened by the following heat treatment. In the first place, the conditions of solution treatment are selected from the temperature range of 500° to 570° C. and the heating time range of 30 minutes to 4 hours These conditions are essential for the reasons which are to be mentioned hereinafter. After the heat exchanger unit is held under the above conditions, it is quenched under conditions which provide a cooling rate of 2.8° C./min to 50° C./min, preferably, 2.8° C./min to 20° C./min down to 200° C. Thus, preferably, the unit is heated at 520° C. for one hour and the quenching operation is carried out under forced air cooling at a rate of about 10° C./min down to 200° C.

While the above description pertains to the embodiment wherein the fin is made of AA 6951 alloy, the aforementioned thermal precipitation type Al alloy is not limited to AA 6951 but AA 6061 may also be employed with success. Thus, using the latter materials, brazed aluminum fin heat exchangers can be fabricated in substantially the same manner as described above.

The aluminum alloys in the Al-Mg-Si series, such as AA 6951, AA 6061 and AA 6063, are characterized in that precipitates coherent with the matrix are formed up until the final precipitation of $Mg_2Si$, which is the equilibrium phase, the alloys age-hardening as the strain of coherence is thus generated. Thus, those alloys age-harden through the following mechanism:

Solid solution →
(Hardens somewhat due to quench strain)

Clusters of Mg. Si →
(Contributes little to hardening)

G.P. Zone →
(Needles of Mg.Si precipitate and, as they grow somewhat, contribute to hardening)

Intermediate Phase →
(approximating Mg:Si = 2:1)
(The first-half of this phase contributes to hardening)

$Mg_2Si$ (equilibrium phase)
(Does not contribute to hardening)

The materials less sensitive to quenching, such as AA 6951 and AA 6061, are comparatively rich in Cu and, therefore, low-temperature precipitates contribute much to high-temperature age-hardening. Thus, sufficient hardening is obtainable even with a slow cooling rate near 2.8° C./min.

For the age-hardening of the heat exchanger unit, the three alternative aging processes illustrated in FIGS. 4, 5 and 6, namely the one-step, incremental and two-stage processes, respectively, are available.

However, in the case of AA 6951 and AA 6061, the incremental and two-stage processes, which provide adequate age-hardening effects even at such comparatively slow quenching rates as aforementioned, are preferably employed. By way of illustration, use may be made of an incremental process in which the heat exchanger unit is heated to 175° C. over 6 hours and then maintained at that temperature for 16 hours or a two-stage process in which the heat exchanger unit is maintained at 100° C. for 24 hours and, thereafter, held at 175° C. for 16 hours.

As to AA 6063 which is lean in Cu, such is not easily hardened even by high-temperature age-hardening if the quenching rate is too slow or the heat exchanger unit is allowed to stand at low temperature for a protracted time. Because of this phenomenon, which is known as split aging, the quenching rate is desirably fast, i.e., significantly higher than 2.8° C./min., and the one-stage aging process is the most desirable of the above three processes. By way of example, immediately following the quenching operation, the heat exchanger unit is heated to 175° C. and maintained at that temperature for at least 16 hours.

Figure 2:
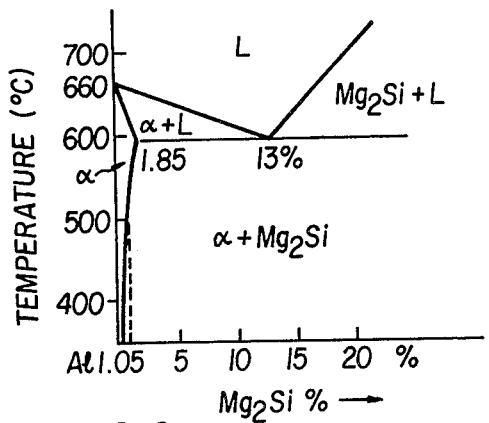
FIG. 2 is an equilibrium phase diagram of the Al-Mg-Si alloy.

The above-noted limitations on the conditions of solution treatment and quenching are set for the reasons mentioned below. In regard to solution treatment, the heating temperature range of 500° to 570° C. has been selected because, at temperatures beyond 570° C., the brazed areas tend to be re-fused. At temperatures below said said threshold of 500° C., when the fin material is AA 6951, AA 6061 or AA 6063, it will not necessarily coincide with the alpha phase on the Al-Mg$_2$Si equilibrium phase diagram of FIG. 2 and, hence, the solution treatment may not have its full effect.

The material to be heat-treated, i.e., the above-mentioned heat exchanger unit, is large-sized, for example 800 by 800 by 5000 millimeters and, therefore, it takes at least 30 minutes to heat it evenly, the aforementioned limit of 4 hours being the maximum.

The aforementioned cooling speed range has been selected for the followng reason. In the case of a heat-treatable aluminum alloy such as AA 6951, the maximum ultimate strength (hardness) of the age-hardened alloy is determined by the cooling rate down to 200° C. in the quenching operation For example, the relation of the quenching rate of AA 6951 with its strength or hardness is shown in FIG. 3.

The primary object of this invention is to provide a brazed aluminum fin heat exchanger having a bursting strength of at least 80 Kg/cm$^2$ and, to accomplish this object, it is essential that the tensile strength of the fin be not less than 16 Kg/mm$^2$.

Figure 3:
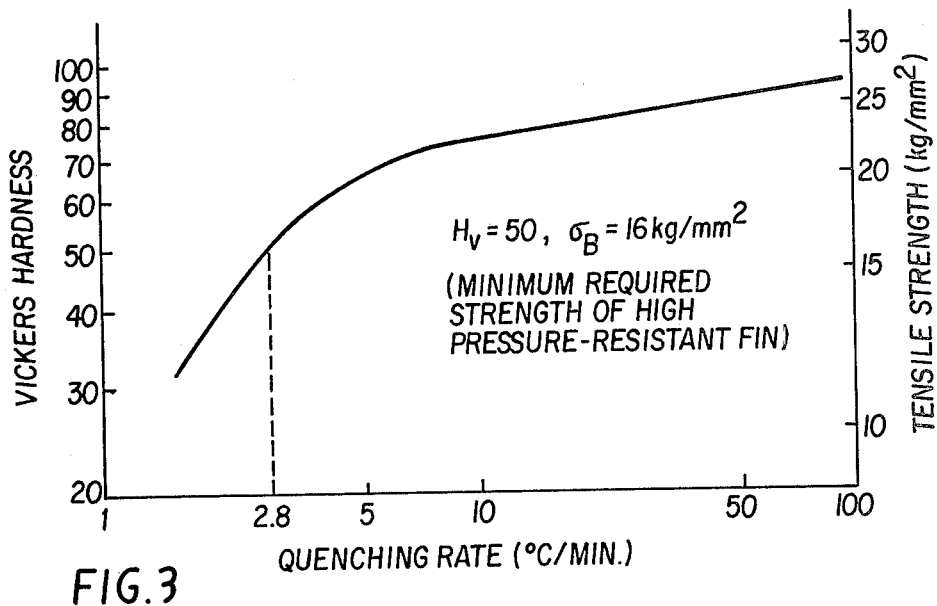
FIG. 3 is a diagrammatic representation of the maximum ultimate hardness or tensile strength attainable by age-hardening as plotted against the quenching rate for AA 6951 material.

Therefore, as will be apparent from FIG. 3, a cooling rate of at least 2.8° C./min is an absolute requirement insofar as it is desired to obtain a a tensile strength of not less than 16 Kg/mm$^2$ and a Vickers hardness of not less than 50. The above-indicated conditions also apply to AA 6061 and AA 6063.

In the brazed aluminum heat exchanger thus fabricated according to this invention, the use of fully annealed alloy, namely AA 6951, AA 6061, or AA 6063, as the fin material provides for very satisfactory fin formation characteristics and when use is made of an appropriate flux, the brazing of the fin to the brazing plates which is as satisfactory as in the prior art is ensured. Furthermore, by virtue of aging under the above-specified conditions, a brazed aluminum fin heat exchanger having a tensile strength of at least 16 Kg/mm$^2$, that is to say a bursting strength of at least 80 Kg/cm$^2$, is successfully obtained. A heat exchanger having a bursting strength of more than 100 Kg/cm$^2$ can also be easily fabricated only if the cooling rate is sufficiently increased. Furthermore, the use of a brazing sheet core made of the same alloy as the fin material results in a significant improvement in the overall strength of the heat exchanger.

Obviously, many modifications and variations of the present invention are possible in light of the above teachings. It is therefore to be understood that within the scope of the appended claims the invention may be practiced otherwise than as specifically described herein.

We claim:

1. A method for fabricating a brazed aluminum fin heat exchanger which essentially comprises a pair of brazing sheets each consisting of a core sheet and a cladding of brazing material disposed on either side of said core sheet and a corrugated fin member interposed between brazing sheets constituting said pair and brazed thereto comprising:

making at least said fin member of a heat-treatable aluminum alloy in an Al-Mg-Si system containing 0.15–0.4% copper, assembling the fin with said brazing sheets into a brazed aluminum fin heat exchanger unit, maintaining said heat exchanger unit at a temperature between 500° C. and 570° C. for a time from 30 minutes to 4 hours, quenching the solution-treated unit to room temperature under conditions which provide a cooling rate of 2.8° C./min to 50° C./min down to 200° C. and, thereafter, age-hardening the quenched unit.

2. The method of claim 1 wherein said cooling rate is within the range 2.8° C./min to 20° C./min.

3. The method of claim 1 wherein said cooling rate is about 10° C./min

4. A method for fabricating a brazed aluminum fin heat exchanger as set forth in claim 1 wherein said heat-treatable aluminum alloy in the Al-Mg-Si system is AA 6951 alloy which consists of 0.15 to 0.4% Cu, 0.2 to 0.5% Si, up to 0.8% Fe, up to 0.1% Mn, 0.4 to 0.8% Mg, up to 0.2% Zn, up to 0.15% others and the balance Al.

5. A method for fabricating a brazed aluminum fin heat exchanger as set forth in claim 1 wherein said heat-treatable aluminum alloy in the Al-Mg-Si system is AA 6061 alloy which consists of 0.15 to 0.4% Cu, 0.4 to 0.8% Si, up to 0.7% Fe, up to 0.15% Mn, 0.8 to 1.2% Mg, up to 0.25% Zn, up to 0.15% Ti, up to 0.15% others and the balance Al.

6. A method for fabricating a brazed aluminum fin heat exchanger as set forth in claim 4 wherein said age-hardening comprises one-step age-hardening comprising maintaining said hat exchanger unit at a temperature between 150° C. and 175° C. for a time not less than 16 hours.

7. A method for fabricating a brazed aluminum fin heat exchanger as set forth in claim 4 wherein said age-hardening comprises incremental age-hardening comprising heating said heat exchanger unit to a temperature between 150° C. and 175° C. over a period of 4 hours and subsequently maintaining said heat exchanger at a temperature between 150° C. and 175° C. for at least 16 hours.

8. A method for fabricating a brazed aluminum fin heat exchanger as set forth in claim 4 wherein said age-hardening comprises two-stage age-hardening comprising maintaining said heat exchanger unit at a temperature between 50° C. and 100° C. for at least 10 hours and subsequently maintaining said heat exchanger at a temperature between 150° C. and 175° C. for at least 16 hours.

9. A method for fabricating a brazed aluminum fin heat exchanger as set forth in claim 5 wherein said age-hardening comprises one-step age-hardening comprising maintaining said heat exchanger unit at a temperature between 150° C. and 175° C. for a time not less than 16 hours.

10. A method for fabricating a brazed aluminum fin heat exchanger as set forth in claim 5 wherein said age-hardening comprises incremental age-hardening comprising heating said heat exchanger unit to a temperature between 150° C. and 175° C. over a period of 4 hours and subsequently maintaining said heat exchanger at a temperature between 150° C. and 175° C. for at least 16 hours.

11. A method for fabricating a brazed aluminum fin heat exchanger as set forth in claim 5 wherein said age-hardening comprises two-stage age-hardening comprising maintaining said heat exchanger unit at a temperature between 50° C. and 100° C. for at least 10 hours and subsequently maintaining said heat exchanger at a temperature between 150° C. and 175° C. for at least 16 hours.

* * * * *